UNITED STATES PATENT OFFICE 2,399,179

COATING COMPOSITION AND METHOD OF PREPARING THE SAME

Howard L. Gerhart, Milwaukee, Wis., assignor to Pittsburgh Plate Glass Company, Allegheny County, Pa., a corporation of Pennsylvania No Drawing. Application December 3, 1943, Serial No. 512,764

6 Claims. (Cl. 260—23)

The present invention relates to the preparation of coating compositions having air drying characteristics, from unsaturated oils and it has particular relation to the preparation of rapid drying coating compositions embodying copolymers of unsaturated glyceride oils and a diolefin, such as cyclopentadiene.

The objects of the invention comprise the provision of a coating medium which is less expensive than conventional media of corresponding drying rate and hardness, more durable and resistant to weathering and attacked by moisture solvents, chemical agencies and the like than the conventional materials and which possess superior wetting powers for pigments which are conventionally incorporated into coating materials.

These and other objects of the invention will be apparent from consideration of the following specification and the appended claims.

Coating media, such as paints and varnishes usually include or consist of certain unsaturated glyceride oils, such as linseed oil and tung oil or China-wood oil, which are commonly termed "drying oils." These drying oils are characterized by a capacity for polymerizing or drying by oxidation and perhaps by addendum reaction to form relatively hard, insoluble bodies capable of strongly adhering to the surfaces to which they are applied. In order to increase the viscosity of the oil and/or the hardness during the early stages of drying and otherwise to improve the films, it is conventional practice in the paint and varnish industry to incorporate into these drying oil coating compositions soluble resinous modifiers which are conventionally termed "gums or oil soluble resins." These so-called "gums" include rosin and modifications thereof, such as ester gum alkyd resins, modified "Bakelite" resins, copal, Manila gums and a great many others which are susceptible of solution in the oil. The "gum" may be employed in substantially any desired ratio, e. g., 5 to 40% and preferably 10 to 20%.

Linseed oil and tung oil or China-wood oil are the most common of the drying oils conventionally employed in the paint and varnish industry. The linseed oil, being produced in large quantities in this country, as well as many other countries, is the more common and least expensive. The China-wood or tung oil is produced in quantities only in certain limited sections of the globe and under present world conditions is very difficult to obtain. The China-wood or tung oil, however, is very desirable in many paints and varnishes because it dries or hardens much more quickly than the linseed oil and the films therefrom are harder and more resistant to moisture and other agencies of deterioration.

In my copending application Serial No. 324,392, filed March 16, 1940, and entitled "Resinous material," is disclosed a process of preparing a resinous copolymer of an unsaturated glyceride oil and a cyclic diene hydrocarbon, such as cyclopentadiene or its dimer dicyclopentadiene. These copolymers may be prepared in a liquid form in which they can be employed in much the same manner as the unmodified drying oils, such as linseed oil or tung oil. They are characterized by a much higher rate of drying than the unmodified oil. It thus becomes possible to employ the cyclopentadiene copolymer of a relatively low drying or non-drying unsaturated glyceride in place of the faster drying oils. For example, the copolymer of cyclopentadiene and soya bean oil can be substituted for linseed oil which is a much faster drying material. The copolymer of linseed oil in turn can be substituted for China-wood or tung oil, very little of which is at present available.

The present invention contemplates the further modification of the copolymers of the unsaturated glyceride oils, such as linseed oil or soya bean oil with the conventional varnish makers "gums" or oil soluble resins to provide further improved products. In accordance with the provisions of the process the "gums" or oil soluble resins are introduced into the reactant mixtures of cyclic diene hydrocarbon and glyceride oil and are there subjected to the conditions employed in polymerization of the oil and cyclic diene. For example, the mixtures are subjected to strong heat and pressure in an autoclave or in continuous flow through a sinuous or coiled, heated tube.

In the practice of the invention cyclopentadiene or preferably its lower polymers, such as dicyclopentadiene, tricyclopentadiene, tetracyclopentadiene or pentacyclopentadiene, i. e., a diene hydrocarbon containing 1 to 5 cyclic $C_5H_6$ groups may be employed. The glyceride oil employed may comprise any of the conventional drying and semi-drying materials, such as soya bean oil, linseed oil, or tung oil; although under present global conditions linseed oil is perhaps preferable. The so-called gums or oil soluble resins, that may be employed to modify the copolymer as previously indicated, include any of the well-known varnish maker gums or oil soluble resins while at the present time, although particular emphasis is placed upon resin, rosin esters, rosin salts, coumarone resins. Coumarone resins are derived by polymerization of coumarone. The coumarone resins are described in the Handbook of Plastics, by Simonds and Ellis, published by D. Van Nostrand Company, Inc., of New York city (page 507) and in the Chemistry of Synthetic Resins, by Ellis Reinhold Publishing Corporation, copyrighted in 1935, vol. 1, chapters 6 and 7. Bakelite is another resin contemplated. Its formula is indicated in the foregoing Handbook of Plastics, page 388. Of course, the structure and characteristics of Bakelite have been widely discussed in the literature. Piccolyte constitutes an additional example of oil soluble resin which may be employed. This resin is terpenic in structure and is described on page 388 of the Handbook of Plastics. The structure is given as

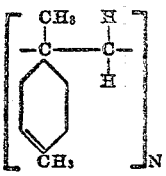

These materials are all admixed in appropriate ratio and subjected to polymerization, preferably under heat and pressure in accordance with certain disclosures in the above-mentioned patent application. The temperature of reaction preferably is above 200° C. and should not be so great as to induce charring or decomposition of any of the components of the mixture or the product. The maximum temperature of course may vary somewhat with the time to which the mixture is subjected to copolymerization. If an autoclave is employed for the reaction the temperature preferably will be approximately within a range of about 220 to 270 or 280° C. If the continuous flow method is employed in which the reactants are caused to pass in a stream through a sinuous or coiled tube the temperature may be considerably higher, e. g., as high as 450° C., thus substantially speeding up the reaction.

The following constitute specific examples, illustrating the preparation of varnish compositions in accordance with the provision of the present invention.

*Example I*

Seven (7) pounds of dicyclopentadiene and 1 pound ester of gum (acid number 20) was heated to 220–230° F. until the ester gum was dissolved. To this solution was added 12 pounds of medium bodied linseed oil and 1 gram of nickel naphthenate. The mixture was copolymerized at 260–270° C. under pressure as already described. The film from this composition is hard and has excellent water resistance.

*Example II*

12.4 pounds of medium bodied linseed oil and 2 pounds of the commercial rosin-maleic-glyceride known as "Amberol 801" was heated at 560° C. for 30 minutes with stirring until the solution was homogeneous when cold. To this was added 6 pounds of commercial dicyclopentadiene of 85% purity and 1 gram nickel naphthenate. The solution was placed in an autoclave and heated to 260° C. with stirring. The pressure rose to 90 pounds per sq. in. as this temperature was approached. Within an hour at this same temperature, the pressure dropped to 20 pounds and then slowly dropped to five pounds after 7 hours of heating. It was drained into an equal weight of naphtha. The body is C. This copolymer is an excellent vehicle for brushing and baking enamels.

*Example III*

Two (2) pounds of zinc rosinate, 12 pounds bodied linseed oil, 6 pounds dicyclopentadiene was heated to 155° C. to effect homogeneity. The autoclave was closed and heated to 270° C. The maximum pressure of 75 pounds dropped to 5 pounds in six hours. Dissolved in an equal weight of naphtha, the body was C. A portion of the unthinned copolymer was heated further in an open vessel according to the varnish procedure at 570° F. until the body at 50% in petroleum spirits was G.

The modified copolymer compositions contemplated by this disclosure dry like varnishes, i. e., they absorb oxygen and are responsive to the addition of the usual metallic driers. The viscosity can be regulated by the body of the glyceride chosen for the charge and by the length of time and temperature of the run. The useful varnish gums or oil soluble resins include rosin, rosin esters, rosin salts, Cumar (coumarone indene identified on page 176 of the Handbook of Plastics) resins, the commercial Bakelites, Piccolytes, etc., listed in the Handbook of Plastics above alluded to.

The advantages of such modified copolymers over the unmodified copolymer are:

(1) They are frequently cheaper without sacrificing durability and drying rate, hardness, etc.

(2) They are frequently more durable and resistant.

(3) They possess a wetting power for pigments which unmodified copolymers lack.

(4) They do not detract from the established advantages of the unmodified copolymer over other low-priced varnishes.

The outstanding usefulness in the surface coatings industry is contained in the fact that the modified copolymers can be made from the readily available linseed or soya oils and that the expensive China-wood oil is unnecessary. It is impossible to make a satisfactory varnish gum or oil soluble resin from ester gum and linseed oil. However, when the ester gum and linseed oil is copolymerized with dicyclopentadiene, the varnish compares with the best obtainable from China-wood oil and ester gum.

It is not at present known whether the gums or resins undergo chemical reaction during the polymerization of the cyclopentadiene and the glyceride oil. In some cases it is possible that such reaction occurs, while in others there may be only physical solution. It is to be understood that the invention is not limited to any particular explanation of the phenomena involved.

It will be understood that the materials obtained may be admixed with coloring matter and pigmentary bodies, such as carbon black, zinc sulfide, precipitated barium sulfate, basic lead carbonate, titanium dioxide and others. The amounts employed of course will be those required to give a desired color, opacity, or other properties to the film. The amounts may be relatively low, e. g., 5% or they may be maximum amounts which can be incorporated without excessive increase of the viscosity of the material. Probably the amount may be increased to 60 or 70%.

Solvents and inert diluents, such as turpentine, naphtha and the like may be included in the composition if so desired.

The forms of the invention herein disclosed are to be considered merely as exemplary. It will be apparent to those skilled in the art that numerous modifications may be made therein without departure from the spirit of the invention or the scope of the appended claims.

What I claim is:

1. A process of preparing a film forming composition suitable for use as a coating medium, which process comprises heating to polymerization temperature in a closed container a mixture of an unsaturated glyceride oil and a diene hydrocarbon consisting of from 1 to 5 cyclic $C_5H_6$ groups per molecule in the presence of a resin soluble therein until polymerization is completed.

2. A process of preparing an air-drying coating medium which comprises heating to polymerization temperature under pressure a mixture of an unsaturated glyceride oil and a diene hydrocarbon containing from 1 to 5 cyclic $C_5H_6$ groups in the presence of a resin soluble therein until polymerization is completed.

3. A process of preparing a coating medium for paints and varnishes comprising heating to polymerization temperature under pressure a mixture of dicyclopentadiene and an unsaturated glyceride oil in the presence of a resin soluble therein until polymerization is completed.

4. A process of preparing a coating medium having air-drying properties which comprises conjointly polymerizing under heat and pressure a cyclopentadiene polymer containing 2 to 5 cyclic $C_5H_6$ groups per molecule and an unsaturated glyceride oil in the presence of a resin soluble in the oil until polymerization is completed.

5. A process of preparing an artificial coating medium comprising conjointly polymerizing a diene hydrocarbon containing from 2 to 5 cyclic $C_5H_6$ groups per molecule and linseed oil in the presence of a resin soluble in the oil, polymerization being effected by heating said mixture to polymerization temperature in a closed container.

6. A process of preparing a coating composition having superior drying properties comprising heating to polymerization temperature under pressure a mixture of soya bean oil and a cyclopentadiene polymer containing from 2 to 5 $C_5H_6$ groups in the presence of a resin which is soluble in the mixture.

HOWARD L. GERHART.